United States Patent
Sminchisescu et al.

(10) Patent No.: US 11,908,071 B2
(45) Date of Patent: Feb. 20, 2024

(54) SYSTEMS AND METHODS FOR RECONSTRUCTING BODY SHAPE AND POSE

(71) Applicant: Google LLC, Mountain View, CA (US)

(72) Inventors: Cristian Sminchisescu, Kanton of Zurich (CH); Mihai Zanfir, Bucharest (RO); Andrei Zanfir, Kanton of Zurich (CH); Eduard Gabriel Bazavan, Kanton of Zurich (CH); William Tafel Freeman, Acton, MA (US); Rahul Sukthankar, Orlando, FL (US)

(73) Assignee: GOOGLE LLC, Mountain View, CA (US)

( * ) Notice: Subject to any disclaimer, the term of this patent is extended or adjusted under 35 U.S.C. 154(b) by 203 days.

(21) Appl. No.: 17/495,960

(22) Filed: Oct. 7, 2021

(65) Prior Publication Data
US 2023/0116884 A1    Apr. 13, 2023

(51) Int. Cl.
*G06T 11/00*      (2006.01)
*G06N 3/08*       (2023.01)
*G06N 20/00*      (2019.01)
*G06T 17/00*      (2006.01)

(52) U.S. Cl.
CPC .............. *G06T 17/00* (2013.01); *G06N 3/08* (2013.01); *G06N 20/00* (2019.01); *G06T 11/003* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 10,849,585 B1* | 12/2020 | Teixeira | A61B 5/055 |
| 2011/0123088 A1* | 5/2011 | Sebok | G06T 11/005 |
| | | | 382/197 |
| 2021/0227152 A1* | 7/2021 | Zhang | G06V 40/161 |
| 2022/0189056 A1* | 6/2022 | Li | G06V 10/955 |

OTHER PUBLICATIONS

Xu et al., "GHUM & GHUML: Generative 3D Human Shape and Articulated Pose Models", 2020 IEEE/CVF Conference on Computer Vision and Pattern Recognition (CVPR), Jun. 13-19, 2020, Seattle, Washington, pp. 6184-6193.

* cited by examiner

*Primary Examiner* — Joni Hsu
(74) *Attorney, Agent, or Firm* — Dority & Manning, P.A.

(57) ABSTRACT

The present disclosure is generally directed to reconstructing representations of bodies from images. An example method of the present disclosure includes inputting, into a machine-learned reconstruction model, input data descriptive of an image depicting a body; predicting, using a machine-learned marker prediction component of the reconstruction model, a set of surface marker locations on the body; and outputting, using a machine-learned marker poser component of the reconstruction model, an output representation of the body that corresponds to the set of surface marker locations. In the example method, one or more parameters of the reconstruction model were learned at least in part based on a consistency loss corresponding to a distance between relaxed-constraint representations generated from a prior set of surface marker locations predicted according to the one or more parameters and parametric representations generated from the prior set using kinematic constraints associated with the body.

20 Claims, 6 Drawing Sheets

SYSTEMS AND METHODS FOR RECONSTRUCTING BODY SHAPE AND POSE

FIELD

The present disclosure relates generally to reconstructing body shape and pose. More particularly, embodiments the present disclosure relate to reconstructing representations of a shape and/or pose of a body from image data.

BACKGROUND

Two-dimensional images are generally easier to capture than three-dimensional recordings of a scene. Therefore, for example, many machine vision applications use two-dimensional imaging. However, some spatial detail may be lost when recording a three-dimensional scene in only two dimensions. It may be desired to recover spatial information about a scene from a two-dimensional image.

SUMMARY

Aspects and advantages of embodiments of the present disclosure will be set forth in part in the following description, or can be learned from the description, or can be learned through practice of the embodiments.

In one example embodiment according to aspects of the present disclosure, an example computer-implemented method for reconstructing representations of bodies from images includes inputting, by one or more computing devices into a machine-learned reconstruction model, input data descriptive of an image depicting a body. The example method includes predicting, by the one or more computing devices and using a machine-learned marker prediction component of the reconstruction model, a set of surface marker locations on the body. The example method includes outputting, by the one or more computing devices and using a machine-learned marker poser component of the reconstruction model, an output representation of the body that corresponds to the set of surface marker locations. In the example method, one or more parameters of the reconstruction model were learned at least in part based on a consistency loss corresponding to a distance between (i) a relaxed-constraint representation generated from a prior set of surface marker locations predicted according to the one or more parameters and (ii) a parametric representation generated from the prior set using kinematic constraints associated with the body.

In some embodiments of the example method, the body is a human body and the kinematic constraints correspond to anthropometric constraints. In some embodiments of the example method, the output representation is a relaxed-constraint representation. In some embodiments of the example method, the marker prediction model includes one or more encoder layers. In some embodiments of the example method, the one or more encoder layers respectively include self-attention models. In some embodiments of the example method, predicting the set of surface marker locations includes encoding, by the one or more computing devices and using the one or more encoder layers, a surface marker embedding along with the input data, and updating, by the one or more computing devices, the set of surface marker locations based at least in part on the encoded surface marker embedding. In some embodiments of the example method, an output of each of the one or more encoder layers is used to iteratively refine the set of surface marker locations, with the output corresponding to the surface marker embedding. In some embodiments of the example method, the one or more encoder layers include a plurality of encoder layers that share one or more machine-learned weights. In some embodiments of the example method, the example method includes transforming, by the one or more computing devices and using a capture model, the input data, and the output representation is obtained in a capture space corresponding to the capture model. In some embodiments of the example method, the capture model is based at least in part on a perspective model.

In one example embodiment according to aspects of the present disclosure, an example system for reconstructing representations of bodies from images includes one or more processors and one or more memory devices storing computer-readable instructions. The computer-readable instructions, when implemented, cause the one or more processors to perform operations. The operations include inputting, into a machine-learned reconstruction model, input data descriptive of an image depicting a body. The operations also include predicting, using a machine-learned marker prediction component of the reconstruction model, a set of surface marker locations on the body. The operations also include outputting, using a machine-learned marker poser component of the reconstruction model, an output representation of the body that corresponds to the set of surface marker locations. In the example system, one or more parameters of the reconstruction model were learned at least in part based on a consistency loss corresponding to a distance between (i) a relaxed-constraint representation generated from a prior set of surface marker locations predicted according to the one or more parameters and (ii) a parametric representation generated from the prior set using kinematic constraints associated with the body.

In some embodiments of the example system, the body is a human body and the kinematic constraints correspond to anthropometric constraints. In some embodiments of the example system, the output representation is a relaxed-constraint representation. In some embodiments of the example system, the marker prediction model includes one or more encoder layers. In some embodiments of the example system, the one or more encoder layers respectively include self-attention models. In some embodiments of the example system, predicting the set of surface marker locations includes encoding, using the one or more encoder layers, a surface marker embedding along with the input data, and updating the set of surface marker locations based at least in part on the encoded surface marker embedding. In some embodiments of the example system, an output of each of the one or more encoder layers is used to iteratively refine the set of surface marker locations, with the output corresponding to the surface marker embedding. In some embodiments of the example system, the one or more encoder layers include a plurality of encoder layers that share one or more machine-learned weights.

In one example embodiment according to aspects of the present disclosure, an example system for reconstructing representations of bodies from images includes one or more processors and one or more memory devices storing computer-readable instructions. The computer-readable instructions, when implemented, cause the one or more processors to perform operations. The operations include inputting, into a machine-learned marker prediction model, input data descriptive of an image depicting a body. The operations also include predicting, using the marker prediction model, a set of surface marker locations on the body. The operations also include outputting, using a machine-learned marker poser model, a parametric representation of the body that corresponds to the set of surface marker locations. In some embodiments of the example system, the operations also include updating one or more parameters of the marker prediction model based at least in part on a consistency loss corresponding to a distance between the parametric representation and a relaxed-constraint representation associated with the predicted set of surface marker locations.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures.

Figure 1:
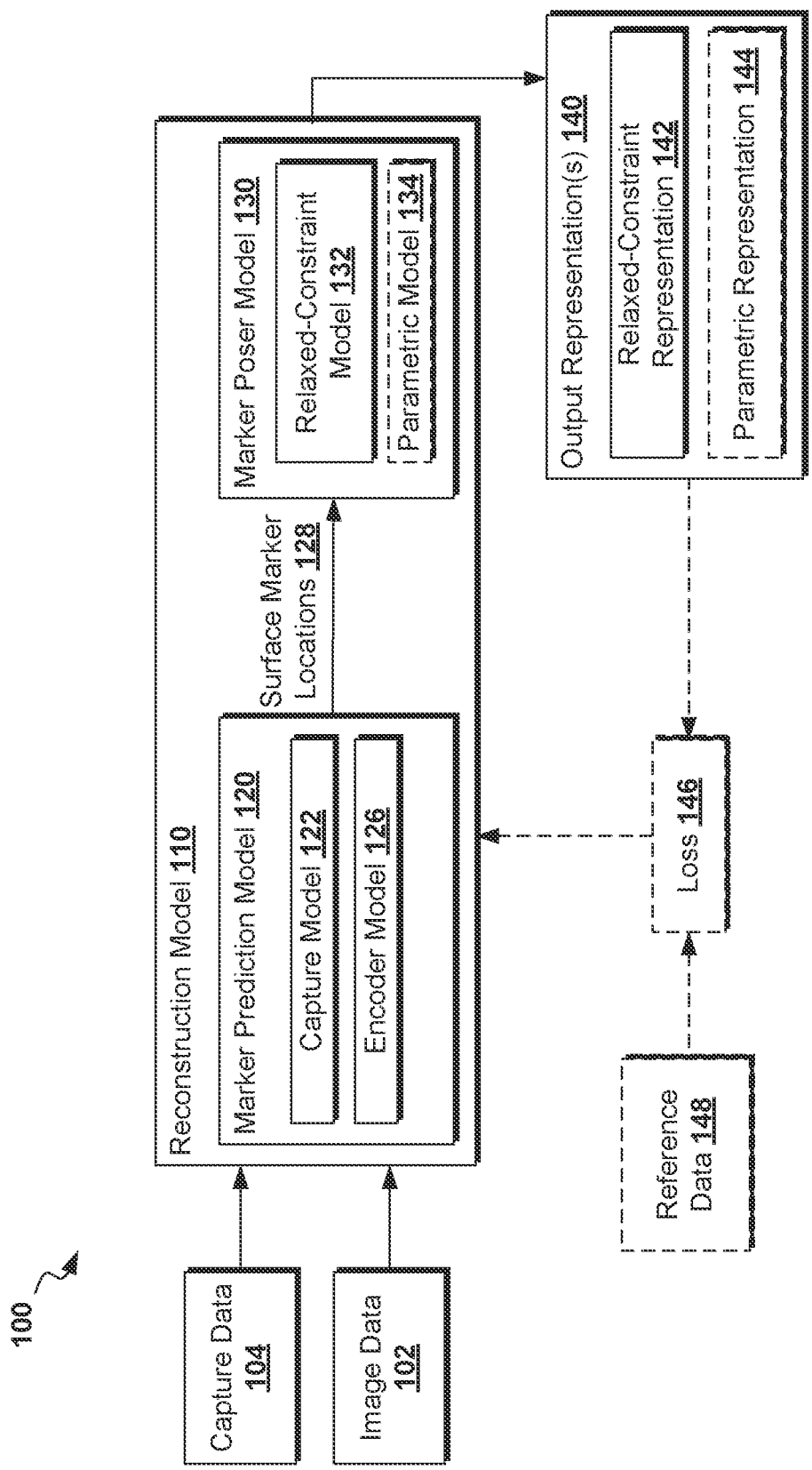
FIG. 1 depicts an example system for reconstructing body shape and/or pose according to example aspects of the present disclosure.

Reference numerals that are repeated across plural figures are intended to identify the same features in various implementations.

DETAILED DESCRIPTION

Overview

Generally, the present disclosure is directed to reconstructing body shape and pose from image data. More particularly, example aspects are directed to systems and methods for generating more accurate three-dimensional representations of a body having a shape and a pose (e.g., a human body) from two-dimensional input image data. In one example embodiment, a set of surface marker locations on the body can be predicted and used as an intermediate registration of the surface of the body. The set of surface marker locations can be used, for example, to generate a direct representation of a body (e.g., a direct mesh corresponding to the surface markers) and a parametric representation of a body (e.g., a mesh output according to a set of body parameters that corresponds to the surface markers). Advantageously, a hybrid approach may be used to leverage a regularizing capability of parametric models of bodies (e.g., more realistic statistical and/or kinematic models of mechanisms, skeletal structures, etc.) and a predictive capability of less-restrained direct models (e.g., more flexible relaxed-constraint body models). For example, in one example embodiment according to aspects of the present disclosure, a machine-learned reconstruction model can be trained using feedback from both a predicted direct mesh and a predicted parametric mesh (e.g., one or more losses or objectives). In this manner, for example, the reconstruction model can advantageously provide improved representations of bodies in space.

Example embodiments according to aspects of the present disclosure provide several improvements over prior techniques. Prior techniques for, e.g., constructing a representation of a human body with shape and pose have generally been limited to regressing parameters of statistical human body models to fit image data or otherwise predicting a set of unconstrained mesh vertices to map onto image data. Some purely parametric models can be too restrained to perfectly fit every variant shape and/or pose of a body, and some purely unconstrained direct-mesh models can result in unrealistic body shapes and poses (e.g., unrealistic contortions).

Advantageously, the set of surface marker locations predicted according to aspects of the present disclosure can provide registration between one or more kinematically-constrained parametric models and one or more relaxed-constraint direct models, providing for the use of a reconstruction model trained using a composite consistency loss based on the parametric model(s) and the direct model(s). In this manner, for example, embodiments of a reconstruction model according to example aspects of the present disclosure can provide for an improved, hybrid approach for generating realistic body representations with better fitment to variant examples (e.g., examples outside of a known range or training set).

In example embodiments according to aspects of the present disclosure, a body can include a human body, an animal body, an object, set of objects, and the like. For instance, a body can be a collective association of elements (e.g., moveable elements) having constrained relationships between the elements. In one example, for instance, a person can be considered a collective association of elements (e.g., body parts, appendages) constrained by anthropometric constraints (e.g., kinematic constraints arising from the musculoskeletal structure of the human body). In another example, for instance, a body can include both a person holding an object (e.g., a baseball player swinging a baseball bat, etc.) and the object itself (e.g., the baseball bat), including any constraints associating the object with the person (e.g., the person's grip on the baseball bat). Similarly, for example, a body can include a person riding a bicycle and the bicycle itself, as the person and the bicycle can be associated with constraints therebetween (e.g., the person's grip on the handlebars and/or placement of feet on one or more pedals). Likewise, a body can include, for example, an animal and associated equipment (e.g., carriage and horse) and/or a plurality of animals (e.g., kangaroo in pouch of mother kangaroo, etc.). A body can also include, for example, an object and/or an assembly of linked objects (e.g., a vehicle with attached wheels). The above examples are provided for the sake of illustration only, and it is to be understood that a body can take many forms and is not limited to the examples provided above.

In example embodiments according to aspects of the present disclosure, it may be desired to determine a representation of a body. For instance, it may be desired to model a body in two-dimensional or three-dimensional space. A representation of a body may be used, e.g., to depict the geometry of the body in a computer-generated image, vision, modelling, processing, rendering, animation, and/or simulation space. For example, a representation of a body can include a mesh of the body (e.g., a set of vertices for building a geometric mesh for the surface of the body) for rendering a depiction of the body in a multi-dimensional space (e.g., two-dimensional, three-dimensional, etc.). In some embodiments, the representation can include, for example, a mesh and/or a set of parameters for obtaining a mesh. In some embodiments, the representation can include, for example, a solid-body model of a body.

In example embodiments according to aspects of the present disclosure, a representation may be reconstructed from image data (e.g., data descriptive of one or more images) corresponding to an imaged depiction of a body. In some embodiments, data descriptive of an image can include the image itself (e.g., pixel data) and/or one or more features of the image (e.g., processed or otherwise determined from the image itself). Image data can include data descriptive of images of various types. In some embodiments, a representation of a body may be obtained by processing a two-dimensional image of the body. In some examples, the images may be monographic, and in some examples, the images may be stereographic. The image(s) may include one or more images, including video, for example. For instance, in some embodiments, a representation may be reconstructed from video of the body. For example, in some embodiments, a representation may be reconstructed from video in substantially real-time to model or otherwise simulate the motion of the body (e.g., in a machine vision task for interacting with the body in space, such as for touching the surface of the body and/or not touching the surface of the body, such as for avoiding the body).

In example embodiments according to aspects of the present disclosure, a representation can correspond to one or more constraints or correspond to a relaxed-constraint architecture (e.g., "model-free" or constraint-free representations). For example, a parametric representation can correspond to one or more constraints on the body, and the parametric representation can be likewise constrained to morph according to manipulations of a set of parameters (e.g., shape parameters, pose parameters, rotation parameters, translation parameters, etc.). For instance, in one embodiment, body representations can be encoded (e.g., using machine-learned encoders) into a set of generative parameters, and the set of generative parameters can be manipulated to generate (e.g., regenerate, reconstruct) a body representation. The reliance of parametric representations on parameters (e.g., parameters learned from a large corpus of body data) can provide, in some examples, for greater adherence to expected body shapes and poses (e.g., corresponding to statistical models, such as kinematic and/or musculoskeletal models of bodies).

In one example embodiment, for instance, parametric representations can be reconstructed according to a parametric model. A parametric model can include, for instance, one or more linear and/or nonlinear models, which may be machine-learned models. In one embodiment, a parametric model can be learned using one or more machine-learned models (e.g., autoencoders, variational autoencoders, etc.). In some embodiments, a parametric model may be a model such as GHUM, introduced by Hongyi Xu, Eduard Gabriel Bazavan, Andrei Zanfir, William T. Freeman, Rahul Sukthankar, & Cristian Sminchisescu, *GHUM & GHUML: Generative 3D Human Shape and Articulated Pose Models*, 2020 IEEE/CVF Conference on Computer Vision and Pattern Recognition 6184.

A relaxed-constraint representation can include, for instance, a representation generated without reference to any constraints (or with reference to weakened constraints) to conform to a body having a shape and pose. In some examples, a relaxed-constraint representation can include a set of vertices of a geometric mesh that can be directly regressed or predicted to conform to a surface of a body (e.g., to surface markers on the body). In this manner, a "direct" representation can provide, in some examples, for greater freedom to conform to individual body shapes and poses without being constrained to parameters (e.g., parameters learned from a large corpus of body data).

In example embodiments according to aspects of the present disclosure, capture data can include one or more characteristics or descriptions of the capture of the image(s) used to reconstruct the representation. For example, when a scene including a body is captured in an image (e.g., a two-dimensional image, a three-dimensional recording, etc.), aspects of the scene may, in some cases, be distorted or otherwise transformed (e.g., optically distorted, mapped to a higher or lower dimensional space, digitized, sampled, compressed, etc.). In some examples, capture data can be used according to a capture model for recovering a representation of the body in (e.g., substantially in) its original/actual state while preserving, for example, relative and actual relationships (e.g., spatial arrangements) of the body and any other bodies in the scene. For example, a capture model can include capture data to provide for mapping a two-dimensional image of a body to a three-dimensional space in which the body is situated. For example, in some embodiments, a capture model contains a perspective model. For example, in some embodiments, a capture model includes a camera model associated with camera intrinsics for recovering representations truer to the original/actual scene. For example, in some embodiments, a capture model may be used to obtain representations in a capture space associated with a device used to capture the image(s) (e.g., the actual device, an approximation of the device, etc.). In this manner, for example, the capture model can be used to effectively recreate the scene observed by the capture device from one or more image(s) recorded by the capture device.

In example embodiments according to aspects of the present disclosure, a reconstruction model can receive capture data and/or image data as inputs. The reconstruction model can generate one or more representations of a body (or bodies) described by the image data. The reconstruction model can include one or more machine-learned model(s) (e.g., neural networks, etc.). In some examples, the reconstruction model can include a plurality of machine-learned models. For instance, the reconstruction model can, in some embodiments, contain one or more component models (e.g., machine-learned component models).

For example, in example embodiments, the reconstruction model includes a marker prediction component model. A marker prediction model constructed according to example aspects of the present disclosure can predict a set of surface marker locations on the body. For example, a depiction of a body may or may not include visible surface markers on the body for tracking or otherwise determining the movement of the body. Embodiments of the marker prediction model can predict where the surface markers would be (or are) located on the body according to a surface marker placement protocol (e.g., a given predetermined mapping of surface markers locations to the surface of the body, etc.). For example, using input image data and optionally capture data, a marker prediction model according to aspects of the present disclosure can predict a set of locations (e.g., in image space and/or in capture space) that would correspond to the placement of the surface markers on the body if surface markers were present (or, e.g., corresponding to the placement of surface markers already present). In this manner, for instance, a marker prediction model can provide for registration of the surface of the body in the image by way of the set of surface marker locations.

In some embodiments, a marker prediction model includes one or more machine-learned model(s). In some examples, a marker prediction model includes one or more image processing models (e.g., neural networks trained for image processing). In some examples, a marker prediction model includes one or more machine-learned encoder model(s). For example, in some embodiments, one or mode encoder model(s) can be used to process one or more embeddings descriptive of the input data (e.g., the image data and/or the capture data) to output a set of surface marker locations.

In one embodiment, for instance, one or more encoder model(s) may be used to process a surface marker embedding. For example, the encoder model(s) can, in some embodiments, update the surface marker embedding for determining a set of surface marker locations. For instance, the surface marker embedding can be provided to an encoder layer, the encoder layer can process the surface marker embedding along with the input data (e.g., the input data transformed according to a capture model) to provide an updated surface marker embedding. The updated surface marker embedding may, for example, then be used to determine the set of surface marker locations. In some examples, an additional encoder layer can then process the updated surface marker embedding to provide further updates, which may also then be used to determine the set of surface marker locations.

In one embodiment, for example, a plurality of encoder layers of the marker prediction model can sequentially process the surface marker embedding and updates thereof to iteratively provide updates to a set of surface marker locations. For example, a set of surface marker locations can be initialized (e.g., according to a default or otherwise expected set for the body), and each encoder layer of a plurality of encoder layers can provide updates to a surface marker embedding which may then be used to refine the set of surface marker locations. In example embodiments, one or more encoder layers may include parameters shared with one or more other encoder layers. In one embodiment, the plurality of encoder layers share all parameters. For example, in one embodiment, the same encoder layer can iteratively process as inputs its own outputs (e.g., recursively).

In some embodiments, a marker prediction model according to aspects of the present disclosure can exhibit attention mechanisms across its inputs. For instance, a marker prediction model can include one or more machine-learned model(s) that exhibit self-attention. For instance, a marker prediction model can include one or more components of transformer model architecture (e.g., one or more transformer encoder layers) or other models that perform self-attention. In this manner, for instance, the marker prediction model can provide for attention (e.g., self-attention) over semantically meaningful regions of the input image data using a compactly executed model architecture.

In example embodiments according to aspects of the present disclosure, a marker poser component model can output a representation of the body based at least in part on the set of surface marker locations predicted by the marker prediction model. For example, a marker poser model can output a representation of the body having a shape and pose corresponding to the body as described in the input image data. In some embodiments, the marker poser model can output a representation of the body having a different shape and pose according to a shape and/or pose input. In some embodiments, a marker poser model can include one or more machine-learned model(s) for predicting one or more parameters of a parametric representation based at least in part on an input set of surface marker locations. In some embodiments, the marker poser model can include a machine-learned model for predicting each of the one or more parameters. Similarly, in some embodiments, the marker poser model can include one or more machine-learned model(s) for predicting a relaxed-constraint representation (e.g., a direct mesh) based at least in part on an input set of surface marker locations.

In example embodiments according to example aspects of the present disclosure, different representations of the body can be used to learn (e.g., train, update) one or more parameters of the reconstruction model. In some examples, the marker poser model can be configured to output different representations of the body. For instance, the marker poser model can be configured to output parametric representations of the body as well as relaxed-constraint representations of the body. In some examples, for instance, the marker poser model can output both a parametric representation of the body and a relaxed-constraint representation of the body from the same set of surface marker locations.

In some example embodiments, one or more parameters of the marker poser model can be learned using a loss based at least in part on different representations of the body. For instance, in some embodiments, the marker poser model is a pre-trained machine-learned model. For instance, the marker poser model can be pre-trained using a set of surface marker data associated with corresponding body representations. In some examples, surface marker locations for training can be directly regressed from a given body representation (e.g., according to a given protocol for locating surface markers on a body) and/or directly obtained from measured surface marker locations for a given ground truth body representation. In this manner, for example, the marker poser model can be trained using a synthetic sampling approach based on, for example, a parametric model. For instance, for a given sampled distribution of generative parameters, reference body representations may be obtained, with surface marker locations directly regressed from those reference body representations. In some embodiments, noise can be injected into the set of locations obtained for training a more robust marker poser model. Using the set of reference representations and locations obtained, for instance, a marker poser model may be trained to map surface marker locations directly to mesh vertices and/or to parameters of a parametric model. In some example embodiments, a marker poser model can be trained to map surface marker locations directly to a predicted relaxed-constraint representation (e.g., predicted mesh vertices) and/or to predicted parameters of a parametric model using a consistency loss that is based at least in part on an error of the predicted parameters and based at least in part on an error of the predicted relaxed-constraint representation. In some embodiments, for instance, the consistency loss can be based at least in part on an error (e.g., a mean-per-vertex error, etc.) computed between the reference representation, and, respectively, the parametric and direct representations. In some embodiments, the consistency loss can be based at least in part on an error (e.g., a mean-per-vertex error, etc.) computed between the parametric and direct representations.

In some example embodiments, one or more parameters of the marker prediction model are learned (e.g., updated) based at least in part on a loss corresponding to a difference (e.g., a distance metric) between a parametric representation of the body and a relaxed-constraint representation of the body. For instance, a consistency loss may be determined based at least in part on a distance (e.g., error) between a set of predicted surface marker locations output by the marker prediction model and an expected set of surface marker locations corresponding to a parametric representation output by the marker poser model. In one embodiment, a consistency loss may be determined based at least in part on an error between a relaxed-constraint representation of the body reconstructed from the set of predicted surface marker locations and a parametric representation of the body reconstructed from the same set of predicted surface marker locations. In this manner, for instance, a consistency loss may correspond to a distance (e.g., error) between a relaxed-constraint representation and a parametric representation.

Example embodiments according to aspects of the present disclosure provide a variety of technical effects and benefits. For example, systems and methods according to example aspects of the present disclosure can provide for improved machine vision capability by providing for improved reconstruction of bodies in the physical world from images. For example, systems and methods according to example aspects of the present disclosure can provide for improved three-dimensional reconstructions of bodies in space using two-dimensional input images, reducing the computational cost and component complexity of reconstructing three-dimensional scenes. In some embodiments, systems and methods according to example aspects of the present disclosure can provide for improved accuracy in reconstruction and/or improved robustness in view of variant body examples. In some examples, systems and methods according to example aspects of the present disclosure can decrease bias in machine vision and other image processing systems by introducing flexible forms of self-supervision which would allow, in principle, for system bootstrapping and adaptation to new domains and fair, diverse subject distributions, for which labeled data may be difficult or impossible to collect upfront.

In some embodiments, systems and methods according to example aspects of the present disclosure can provide for decreased latency in processing image data to reconstruct representations of bodies depicted in the image data. For example, in some embodiments, marker prediction models according to aspects of the present disclosure can provide for increased efficiency (e.g., due to lower parameter count, operation count, operation parallelizability, etc.) for improved pipeline processing (e.g., during training and/or at inference).

With reference now to the Figures, example embodiments of the present disclosure will be discussed in further detail.

Example Devices and Systems

FIG. 1 depicts an example system 100 for reconstructing a representation of a body from input image data 102 and optional capture data 104 using a reconstruction model 110. The reconstruction model 110 can include, for example, a marker prediction model 120 and a marker poser model 130.

As shown in the example system 100 depicted in FIG. 1, embodiments of the marker prediction model 120 may include a capture model 122 and an encoder model 126 (e.g., including one or more encoder layers). In the example shown, the marker prediction model 120 can output a set of surface marker locations 128 to the marker poser model 130.

Embodiments of the marker poser model 130 can include a relaxed-constraint model 132 and a parametric model 134 for generating output representations 140, which can include a relaxed-constraint representation 142 and a parametric representation 144. In some embodiments (e.g., at inference) the parametric model 134 is absent from the marker poser model 130 and the relaxed-constraint representation 142 is the only output representation 140. In some embodiments, the output representation 140 is based on a combination of the relaxed-constraint representation 142 and the parametric representation 144 (e.g., a linear combination, a nonlinear combination, etc.). In some embodiments, the output representation 140 is based on a choice between relaxed-constraint representation 142 and parametric representation 144 according to a predetermined heuristic (e.g., according to a threshold based on one or more constraints, such as kinematic or contextual constraints). For instance, if it is desired (e.g., for realism) that a body have a shape and/or pose within given thresholds, an output representation 140 can be determined from the relaxed-constraint representation 142 and the parametric representation 144 that adheres or otherwise better aligns with the thresholds.

In some embodiments (e.g., during training), a loss 146 can be determined based at least in part on the relaxed-constraint representation 142 and the parametric representation 144 (or values associated with the relaxed-constraint representation 142 and the parametric representation 144, such as markers regressed from or otherwise corresponding to any one or both of the relaxed-constraint representation 142 and the parametric representation 144). In some embodiments, the loss 148 can be based at least in part on reference data 148 (e.g., a reference representation). In some embodiments, the loss 148 is a consistency loss.

In some embodiments, the marker prediction model 120 and the marker poser model 130 can be trained together. In some embodiments, the marker prediction model 120 and the marker poser 130 can be trained separately (e.g., independently, in stages, etc.).

Figure 2:
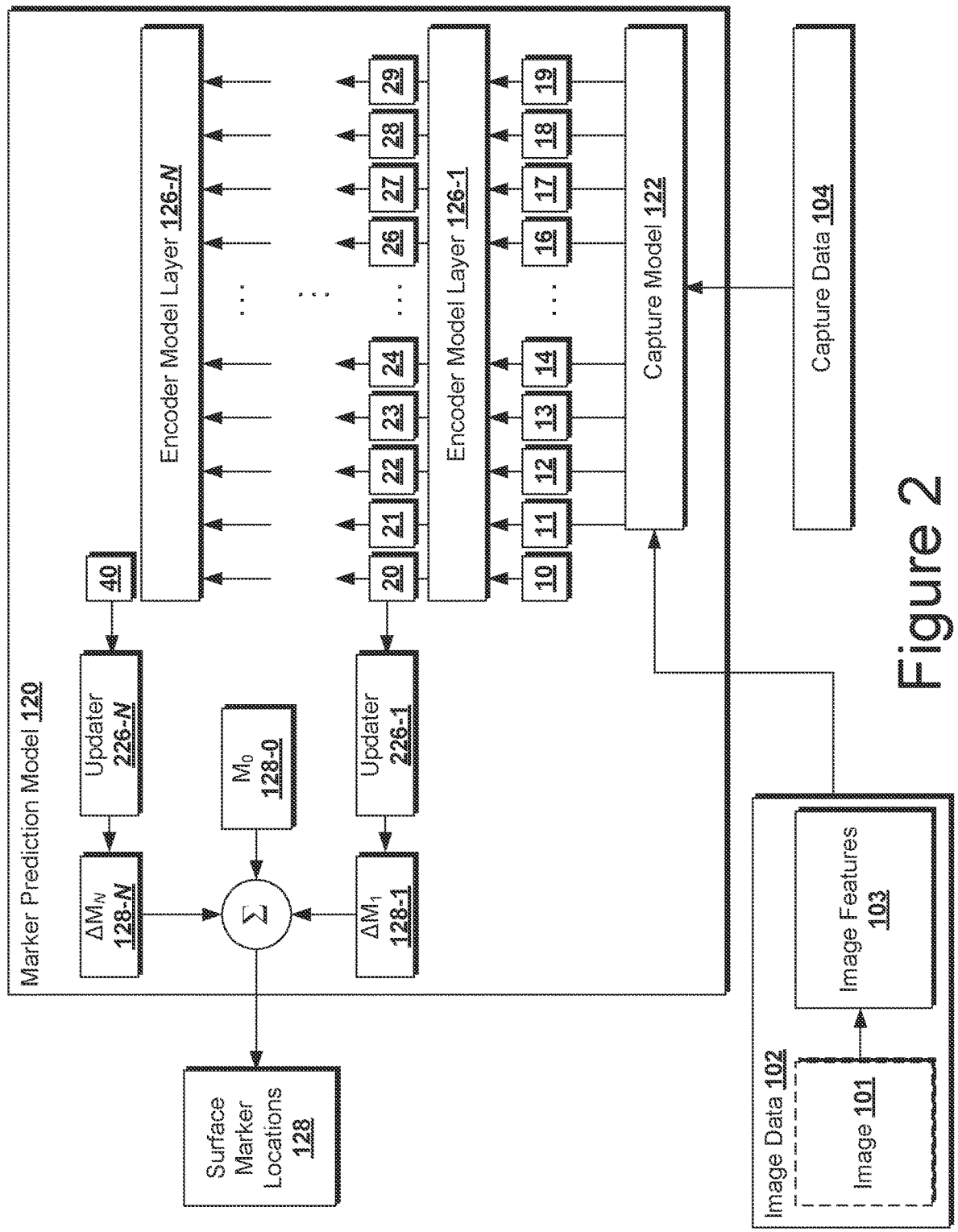
FIG. 2 depicts an example marker prediction model according to example aspects of the present disclosure.

FIG. 2 depicts one example embodiment of the marker prediction model 120. Image data 102 can include an image 101 and/or image features 103 (e.g., generated by an image processor, such as by a machine-learned image classifier). The capture model 122 can receive the input image data 102 and capture data 104 to provide inputs (e.g., inputs 11-19) to encoder model layer 126-1. The inputs 11-19 can include serialized image data 102 (e.g., serialized image features 103), combined (e.g., concatenated) with capture data 104 and one or more positional encodings, as transformed according to the capture model 122. Input 10 can include, for example, a surface marker embedding. Output 20 can include, for example, an updated surface marker embedding as processed by the encoder model layer 126-1. Outputs 21-29 can include, for example, outputs corresponding to inputs 11-19. In some examples, output 20 can be passed to updater 226-1 which provides a first surface marker location refinement ΔM1 128-1 based on the output 20. Outputs 20-29 can be passed to one or more encoder model layers, including, without loss of generality, N-th encoder model layer 126-N, which may be the same as or different than encoder model layer 126-1. The N-th encoder model layer 126-N provides at least an output 40 (e.g., corresponding to an updated surface marker embedding), which can also be passed to updater 226-N (which may be the same as or different than updater 226-1) for providing an N-th surface marker location refinement ΔMN 128-N. The surface marker refinements (e.g., the first surface marker location refinement ΔM1 128-1 through the N-th surface marker location refinement ΔMN 128-N) can be combined with an initial set of surface marker locations M0 128-0 to provide the predicted set of surface marker locations 128.

Figure 3A:
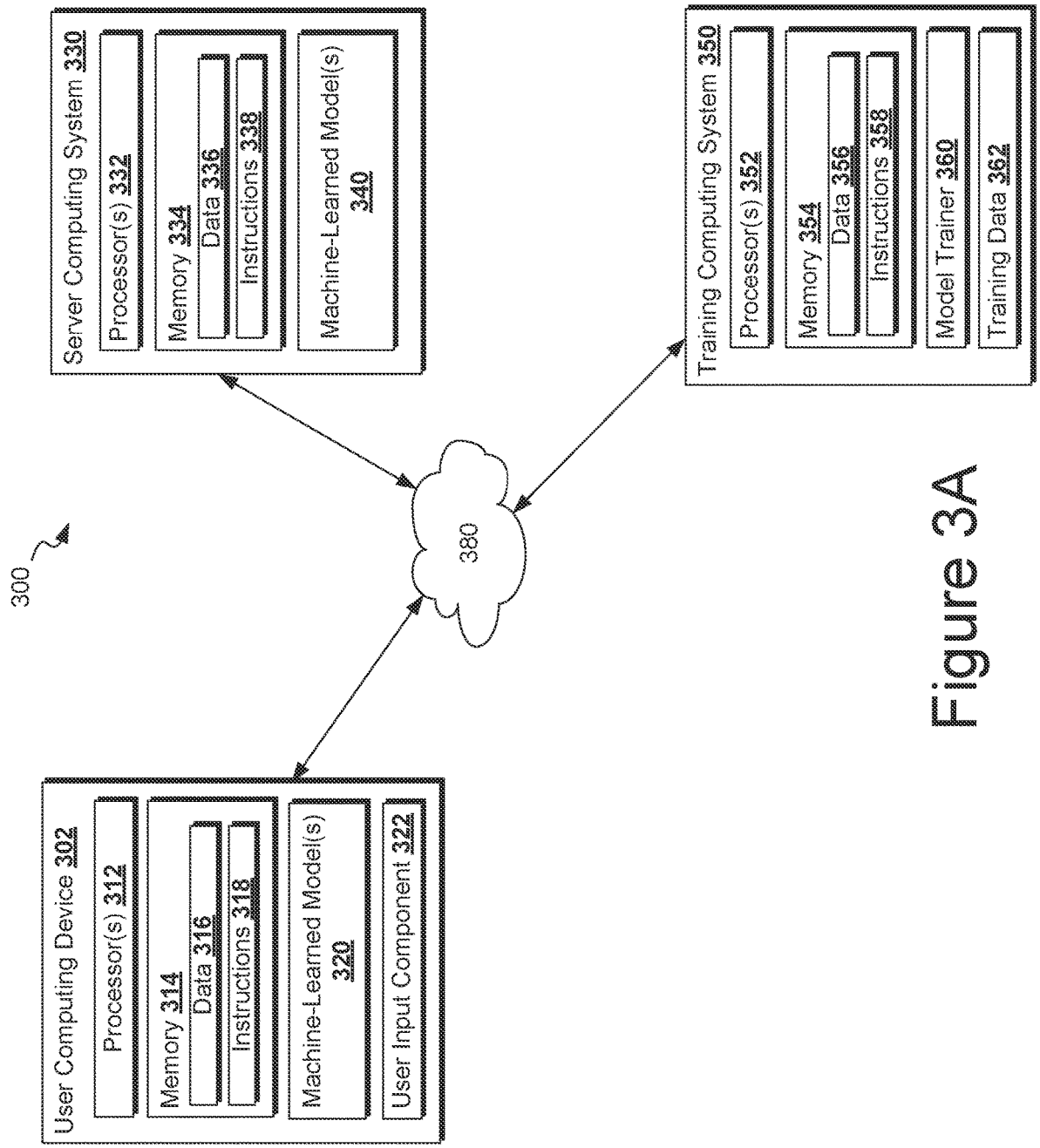
FIG. 3A depicts a block diagram of an example computing system for reconstructing body shape and/or pose according to example aspects of the present disclosure.

FIG. 3A depicts a block diagram of an example computing system 300 that performs constructing a representation of a human body with shape and pose according to example embodiments of the present disclosure. The system 300 includes a user computing device 302, a server computing system 330, and a training computing system 350 that are communicatively coupled over a network 380.

The user computing device 302 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 302 includes one or more processors 312 and a memory 314. The one or more processors 312 can be any suitable processing device (e.g., a processor core, a microprocessor, an ASIC, an FPGA, a controller, a microcontroller, etc.) and can be one processor or a plurality of processors that are operatively connected. The memory 314 can include one or more non-transitory computer-readable storage media, such as RAM, ROM, EEPROM, EPROM, flash memory devices, magnetic disks, etc., and combinations thereof. The memory 314 can store data 316 and instructions 318 which are executed by the processor 312 to cause the user computing device 302 to perform operations.

In some implementations, the user computing device 302 can store or include one or more reconstruction models 320 (e.g., including a marker prediction model and/or a marker poser model). For example, the reconstruction models 320 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example reconstruction models 320 are discussed with reference to FIGS. 1 and 2.

In some implementations, the one or more reconstruction models 320 can be received from the server computing system 330 over network 380, stored in the user computing device memory 314, and then used or otherwise implemented by the one or more processors 312. In some implementations, the user computing device 302 can implement multiple parallel instances of a single reconstruction model 320 (e.g., to perform parallel reconstruction across multiple instances).

Additionally, or alternatively, one or more reconstruction models 340 can be included in or otherwise stored and implemented by the server computing system 330 that communicates with the user computing device 302 according to a client-server relationship. For example, the reconstruction models 340 can be implemented by the server computing system 340 as a portion of a web service (e.g., a reconstruction service). Thus, one or more models 320 can be stored and implemented at the user computing device 302 and/or one or more models 340 can be stored and implemented at the server computing system 330.

The user computing device 302 can also include one or more user input components 322 that receives user input. For example, the user input component 322 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 330 includes one or more processors 332 and a memory 334. The one or more processors 332 can be any suitable processing device (e.g., a processor core, a microprocessor, an ASIC, an FPGA, a controller, a microcontroller, etc.) and can be one processor or a plurality of processors that are operatively connected. The memory 334 can include one or more non-transitory computer-readable storage media, such as RAM, ROM, EEPROM, EPROM, flash memory devices, magnetic disks, etc., and combinations thereof. The memory 334 can store data 336 and instructions 338 which are executed by the processor 332 to cause the server computing system 330 to perform operations.

In some implementations, the server computing system 330 includes or is otherwise implemented by one or more server computing devices. In instances in which the server computing system 330 includes plural server computing devices, such server computing devices can operate according to sequential computing architectures, parallel computing architectures, or some combination thereof.

As described above, the server computing system 330 can store or otherwise include one or more reconstruction models 340. For example, the models 340 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 340 are discussed with reference to FIGS. 1 and 2.

The user computing device 302 and/or the server computing system 330 can train the models 320 and/or 340 via interaction with the training computing system 350 that is communicatively coupled over the network 380. The training computing system 350 can be separate from the server computing system 330 or can be a portion of the server computing system 330.

The training computing system 350 includes one or more processors 352 and a memory 354. The one or more processors 352 can be any suitable processing device (e.g., a processor core, a microprocessor, an ASIC, an FPGA, a controller, a microcontroller, etc.) and can be one processor or a plurality of processors that are operatively connected. The memory 354 can include one or more non-transitory computer-readable storage media, such as RAM, ROM, EEPROM, EPROM, flash memory devices, magnetic disks, etc., and combinations thereof. The memory 354 can store data 356 and instructions 358 which are executed by the processor 352 to cause the training computing system 350 to perform operations. In some implementations, the training computing system 350 includes or is otherwise implemented by one or more server computing devices.

The training computing system 350 can include a model trainer 360 that trains the machine-learned models 320 and/or 340 stored at the user computing device 302 and/or the server computing system 330 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 360 can perform a number of generalization techniques (e.g., weight decays, dropouts, etc.) to improve the generalization capability of the models being trained.

In particular, the model trainer 360 can train the reconstruction models 320 and/or 340 based on a set of training data 362. In some implementations, if the user has provided consent, the training examples can be provided by the user computing device 302. Thus, in such implementations, the model 320 provided to the user computing device 302 can be trained by the training computing system 350 on user-specific data received from the user computing device 302. In some instances, this process can be referred to as personalizing the model.

The model trainer 360 includes computer logic utilized to provide desired functionality. The model trainer 360 can be implemented in hardware, firmware, and/or software controlling a general purpose processor. For example, in some implementations, the model trainer 360 includes program files stored on a storage device, loaded into a memory and executed by one or more processors. In other implementations, the model trainer 360 includes one or more sets of computer-executable instructions that are stored in a tangible computer-readable storage medium such as RAM, hard disk, or optical or magnetic media.

The network 380 can be any type of communications network, such as a local area network (e.g., intranet), wide area network (e.g., Internet), or some combination thereof and can include any number of wired or wireless links. In general, communication over the network 380 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases, including a pipeline including a plurality of machine-learned model(s), including one or more machine-learned model(s) upstream and/or downstream of the reconstruction model.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 3A illustrates one example computing system that can be used to implement the present disclosure. Other computing systems can be used as well. For example, in some implementations, the user computing device 302 can include the model trainer 360 and the training dataset 362. In such implementations, the models 320 can be both trained and used locally at the user computing device 302. In some of such implementations, the user computing device 302 can implement the model trainer 360 to personalize the models 320 based on user-specific data.

Figure 3B:
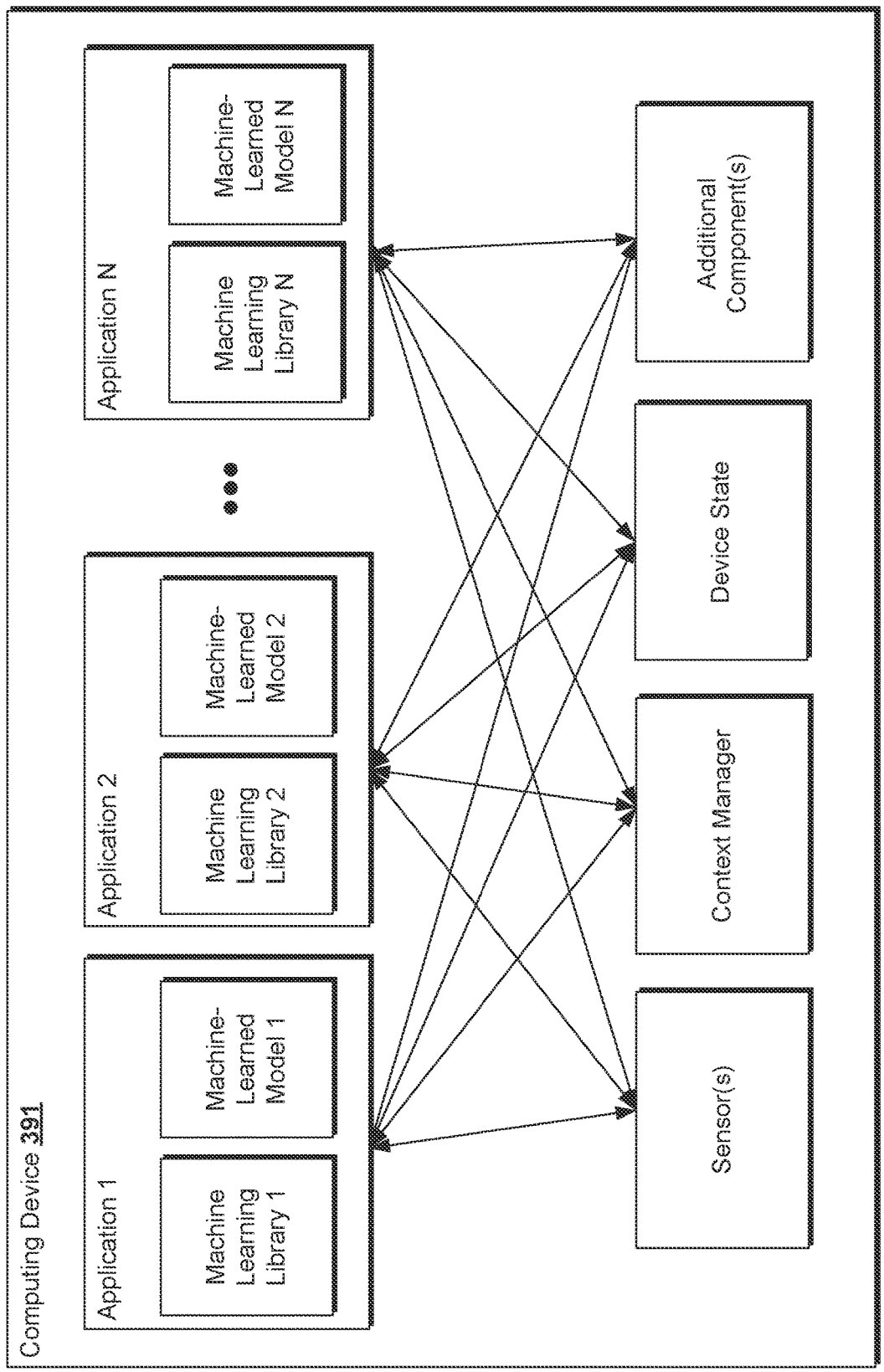
FIG. 3B depicts a block diagram of an example computing device for reconstructing body shape and/or pose according to example aspects of the present disclosure.

FIG. 3B depicts a block diagram of an example computing device 391 that performs according to example embodiments of the present disclosure. The computing device 391 can be a user computing device or a server computing device.

The computing device 391 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
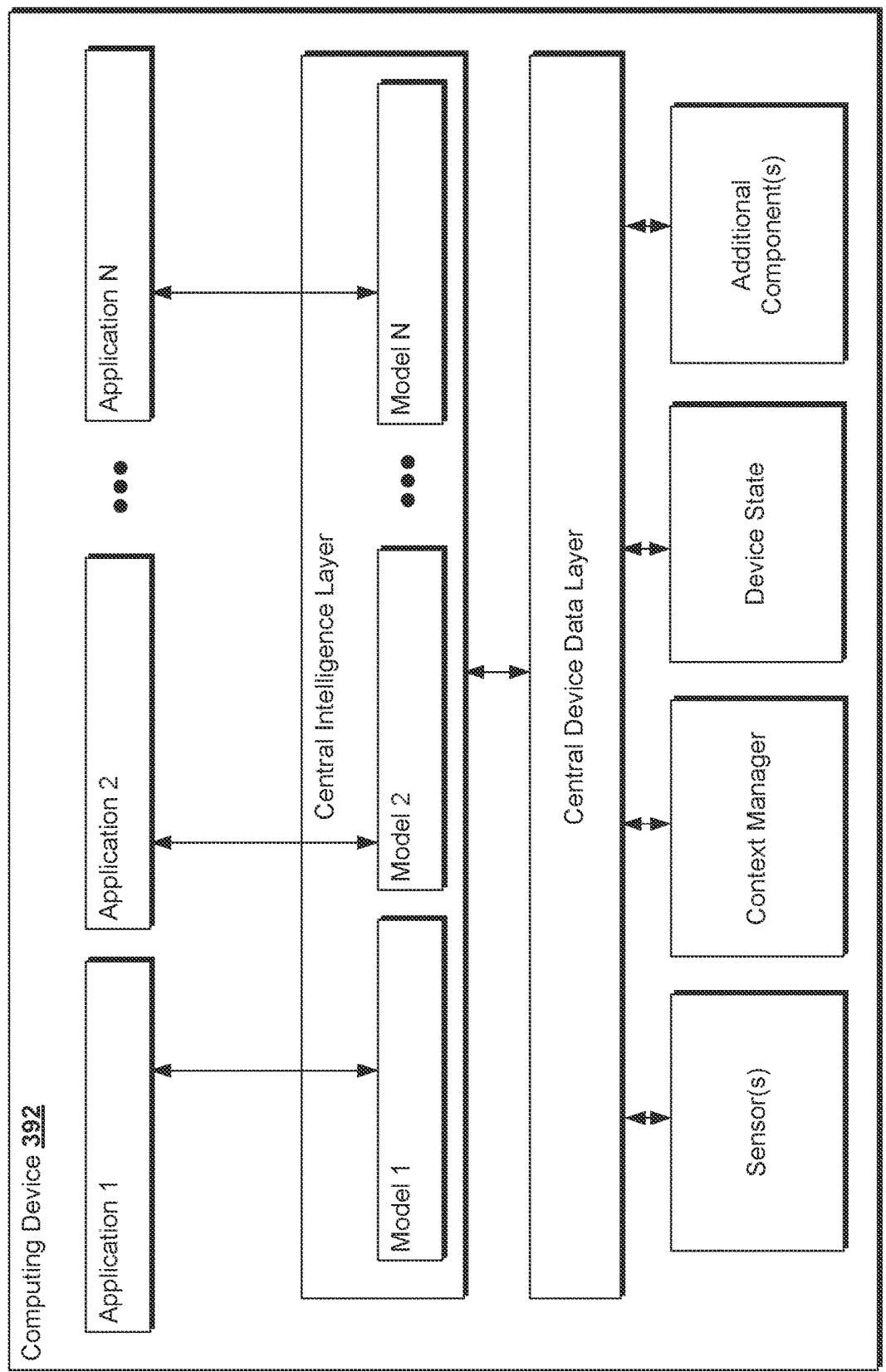
FIG. 3C depicts a block diagram of an example computing device for reconstructing body shape and/or pose according to example aspects of the present disclosure.

FIG. 3C depicts a block diagram of an example computing device 392 that performs according to example embodiments of the present disclosure. The computing device 392 can be a user computing device or a server computing device.

The computing device 392 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 392.

The central intelligence layer can communicate with a central device data layer. The central device data layer can be a centralized repository of data for the computing device 392. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Results

In one example according to an embodiment presented here for illustration only, a mesh may be generated to depict the pose and the shape of a human body. In this example, $V_d$ is a mesh that is directly predicted from markers applied to or otherwise depicted or projected on the body, and $V_p$ is a mesh that is parametrically obtained by posing a parametric model given parameters regressed from the markers.

Inputs: Input capture data and input image data are provided to a reconstruction model in this example. When a pinhole camera model is used as a capture model, as in this example, input capture data can include camera intrinsics $$C=[f_x, f_y, c_x, c_y]^T$$

and associated perspective projection operation $$x_{2D} = \Pi(x_{3D}, C)$$

where $x_{3D} \in \mathbb{R}^{3 \times 1}$. When working with cropped images, as in this example, the intrinsics may be adapted such that projecting the same 3D points—either in the cropped image or the original, full image—can give the same alignment. The transformation of camera intrinsics C into corresponding crop intrinsics $C_c$ may be expressed as $$[C_c^T 1]^T = K[C^T 1]^T$$

where $K \in \mathbb{R}^{5 \times 5}$ is the scale and translation matrix for adapting the image intrinsics C. In this example, using a perspective camera model provides for reconstructions to be obtained in camera space. In this manner, for example, there can be translation and relative positioning of one subject in the scene (or relative positioning of multiple subjects) when reconstructing from monocular images. A perspective model can provide accuracy and/or other representational advantages for the imaging transformation as compared to an orthographic model.

Input image data in this example includes an image (e.g., a cropped image) $I \in \mathbb{R}^{W \times H \times 3}$ of a person corresponding to pseudo ground-truth camera intrinsics $C \in \mathbb{R}^{1 \times 4}$ associated with the crop of the image. A convolutional neural network is used in this example to process the input image and extract a feature map representation. In some embodiments, the feature map representation may be expressed as $F \in \mathbb{R}^{W \times H \times D}$, although in this example, a downsampled feature map is used, expressed as $$F \in \mathbb{R}^{\frac{W}{32} \times \frac{H}{32} \times D}.$$

This example uses a ResNet50 backbone with 23.5M parameters pretrained for the ImageNet image classification task.

In this example, the feature map is flattened along the spatial dimensions (e.g., serialized) to get a sequence of N tokens, where $$N = \frac{W}{32} \times \frac{H}{32}$$

and the camera intrinsics are appended to each token to get input feature sequence $F_s \in \mathbb{R}^{N \times (D+4)}$. This sequence is linearly embedded by means of matrix $E \in \mathbb{R}^{(D+4) \times D'}$ where D' is the embedding dimensionality. The sequence is concatenated with an extra learnable [markers] token $F_m \in \mathbb{R}^{1 \times D'}$. Next, learnable positional embeddings $E_{pos} \in \mathbb{R}^{(N+1) \times D'}$ are added to the sequence.

Marker Prediction Model: A marker prediction model in a reconstruction model of this example receives the input capture data and input image data. In this example, the markers are essentially free, three-degrees-of-freedom variables, but they follow a given surface placement description. In this example, the VICON protocol was followed for marker placement.

In this example, the marker prediction model begins with a set of default marker coordinates $M_0$. $M_0$ is computed based on default parameters $(\theta_0, \beta_0, r_0, t_0)$ and camera intrinsics and is expressed as $$M_0 = WV(\theta_0, \beta_0, r_0, t_0).$$

In this example, a translation $t_0^*$ was found such that the corresponding posed mesh projects in the center of the image.

A single transformer encoder layer TL in the marker prediction model is used to iteratively refine $M_0$ for a number of steps L. Using a shared MLP applied on the representation of the [markers] token, a refinement update $\Delta M_l \in \mathbb{R}^{N_m \times 3}$ is collected at each stage $l \in \{1 \ldots L\}$, with $N_m$ being the number of markers, from each transformed representation $Z_l$ as $\Delta M_l = MLP(Z_l^0)$, where $$Z_0 = \begin{bmatrix} F_m \\ F_s E \end{bmatrix} + E_{pos} \text{ and}$$

$$Z_l = TL(Z_{l-1}).$$

The refinement updates $\Delta M_l$ are added to the default marker coordinates $M_0$ such that $$M_L = M_0 + \lambda \Sigma_{l=1}^{L} \Delta M_l$$

where $\lambda$ is a parameter controlling the step size. In this example, L=4, $\lambda$=1, the embedding size is 256, and 8 heads are used for the MultiHeadAttention layer. This example uses 1.5M parameters for the transformer layer and the MLP regressor.

Marker Poser Model: A marker poser model receives the output $M_L$ of the marker prediction model in this example. Two example network heads are used in the marker poser model for this example, which given a set of 3D markers $M \in \mathbb{R}^{N_v \times 3}$ can, for example, reconstruct the mesh through an architecture $V_d(M) \in \mathbb{R}^{N_v \times 3}$ and recover the corresponding parameters $(\theta, \beta, r, t)$, regressed as $(\tilde{\theta}, \tilde{\beta}, \tilde{r}, \tilde{t})$, from M, for generating a parametric mesh $V_p(\tilde{\theta}, \tilde{\beta}, \tilde{r}, \tilde{t})$ corresponding to a direct mesh $V_d$.

The example parametric model in this example is pre-trained end-to-end, in a deep learning framework, using a large corpus of human shapes and motions. The example parametric model has generative body shape and facial expressions $\beta = (\beta_b, \beta_f)$ represented using deep variational auto-encoders and generative pose $\theta = (\theta_b, \theta_{lh}, \theta_{rh})$ for the body, left hand, and right hand, respectively represented as normalizing flows. The pelvis translation and rotation are controlled separately and represented by a 6d rotation representation $r \in \mathbb{R}^{6 \times 1}$ and a translation vector $t \in \mathbb{R}^{4 \times 1}$ with respect to the origin (0,0,0). The mesh consists of $N_v$=10,168 vertices and $N_f$=20,332 triangles. To pose the mesh, a parametric mesh $V_p(\theta_b, \beta_b, r, t) \in \mathbb{R}^{N_v \times 3}$ may be generated to obtain the posed vertices. For the sake of illustration only, facial expressions and hand poses may be omitted, and the b subscript may be dropped for convenience.

A synthetic sampling approach may be employed in this example based on the parametric model. Given generative codes for pose and shape $\theta, \beta \in \mathcal{N}(0;1)$; r drawn from the Haar distribution on SO(3), and t uniformly sampled from a $(-20 \ldots 20) \times (-20 \ldots 20) \times (-20 \ldots 20)$ meter box, a posed sample parametric mesh $V(\theta, \beta, r, t)$ may be generated. The associated markers are retrieved in this example by a simple (e.g., fixed) linear regression matrix $W \in \mathbb{R}^{N_v \times N_m}$, such that $M = WV(\theta_b, \beta_b, r, t)$. In this example, injecting noise at this point—e.g., $M + \mathcal{N}(0; \epsilon 1)$—can support improved retrieval of the full mesh from real (e.g., imprecise) markers that may be found in motion capture datasets such as CMU or Human3.6M, or as produced by an image-based marker regressor.

In this example, the mean marker position (computed as the 3d centroid of each M) is subtracted before regressing $(\theta, \beta, r, t)$. In some embodiments, subtracting the mean marker position can provide for lower reconstruction errors. In some embodiments, subtracting the mean marker position can provide for easier training workloads.

In this example, the marker poser model was pre-trained and applied on $M_L$ to recover $\{V_d, \tilde{\theta}, \tilde{\beta}, \tilde{r}, \tilde{t}\}$, providing a direct mesh $V_d$ and permitting the recovery of a parametric mesh geometry from the regressed model parameters as $V_p(\tilde{\theta}, \tilde{\beta}, \tilde{r}, \tilde{t})$. For pre-training the marker poser model in this example, a loss $\mathcal{L}$ is used, with $$\mathcal{L} = \mathcal{L}_p(V, V_p) + \mathcal{L}_d(V, V_d)$$

and where $\mathcal{L}_p$ and $\mathcal{L}_d$ are the mean-per-vertex errors, computed using an $L_2$ metric, between the input mesh and the parametric and direct meshes, respectively. A dataset of corresponding markers and vertices may be used to train. For practical considerations, and without loss of generality, this example uses the Human3.6M marker set that consists of $N_m$=53 units. In this example, the marker poser has 8.5M parameters and uses MLPs with a hidden layer size of 256. The network is trained for 1M steps with a batch size of 128.

In this example, during training of the marker poser model, six levels of Gaussian noise were added to the markers, as $\epsilon \in \{1,2,5,10,20,50\}$ mm. Each one of the trained marker poser models were tested on the Human3.6M ground-truth marker data. In this example, better performance in reconstruction is achieved for the network with $\epsilon$=5 mm, which is the valued used in this example. During training, the error on the direct mesh reconstruction reaches 25 mm mean per vertex position error ("MPVPE") (compared to 26 mm without noise), while the parametric mesh reconstruction reaches 37 mm MPVPE (compared to 30.7 mm without noise).

Training the Marker Prediction Model: As discussed above, embodiments according to aspects of the present disclosure can leverage losses based in part on relaxed-constraint model representations and in part on parametrically-constrained model representations and can provide for improved accuracy with improved consistency with, e.g., human anthropometry. During training, a mixed regime based on both 2D supervision losses and full 3D supervision losses is used where data is available.

For instance, in this example, a consistency loss is defined between the two representations output by the marker poser model. In this example, the consistency loss measures the mean per-marker position error ("MPMPE") between the predicted markers and the markers $M_p$ mapped to the surface of $V_p$, where $$M_p = WV_p \text{ giving}$$

$$\mathcal{L}_m = \frac{1}{N_m} \sum_{i=1}^{N_m} \|M_L^i - M_p^i\|_2.$$

In this manner, a consistency loss is defined in this example between the markers predicted subject to relaxed constraints and the markers $M_p$ mapped to the parametrically-constrained (e.g., kinematically constrained) model representation $V_p$.

In this example, regularization losses for pose and shape may be expressed as $$\mathcal{L}_{ps} = \|\hat{\beta}\|_2^2 + \|\hat{\theta}\|_2^2.$$

In this example, a 2D reprojection loss is also used, measured with respect to either annotated or predicted keypoints $j \in \mathbb{R}^{K \times 2}$ and weighted by a per-keypoint confidence score $S \in \mathbb{R}^{K \times 1}$, with K the number of keypoints. From the directly regressed mesh $V_d$ a set of 3D joints j may be extracted (e.g., via the parametric model regressor) and project them using camera intrinsics $C_c$ to predict 2D keypoints and give loss $$\mathcal{L}_k = \frac{1}{K} \sum_{i=1}^{K} s_i \|j_i - \Pi(J_i(V_d), C_c)\|_2$$

In this example, a soft differentiable rasterizer is used to compute a body part alignment loss $\mathcal{L}_b$ with respect to either ground-truth or predicted body part maps $B \in \mathbb{R}^{W \times H \times 15}$, with 15 different body part labels, expressed as $$\mathcal{L}_b = \frac{1}{W * H} \sum_{i=1}^{W*H} \|B_i - R(V_d, C_c)_i\|_1$$

where R is the rasterized image of the 3D body parts of $V_d$ projected using camera intrinsics $C_c$.

In this example, given access to 3D supervision with ground-truth vertices $V_{gt}$ and joints $J_{gt}$, a standard vertex and 3D keypoints loss may be expressed as $$\mathcal{L}_f = \lambda_v \mathcal{L}_v(V_d, V_{gt}) + \lambda_j \mathcal{L}_j(J, J_{gt})$$

with $\mathcal{L}_v$ being MPVPE and $\mathcal{L}_j$ the mean per joint position error metric ("MPJPE"). Parameters $\lambda_v$ and $\lambda_j$ control the importance of each loss. In this example, $\lambda_v = 0.75, \lambda_j = 0.25$.

In this example, the full loss function (where data is available) may be written as $$\mathcal{L} = \lambda_{ps}\mathcal{L}_{ps} + \lambda_m\mathcal{L}_m + \lambda_k\mathcal{L}_k + \lambda_b\mathcal{L}_b + \mathcal{L}_f$$

where $\lambda$ are used to weigh the different loss components. The fully supervised loss $\mathcal{L}_f$ is only used in this example if there exists three-dimensional ground truth information. In this example, $\lambda_{ps}=2.5, \lambda_m=50, \lambda_k=1, \lambda_b=25$.

In this example, training was conducted for 50 epochs with batch size of 32, base learning rate of 1e$^{-4}$, and exponential decay of 0.99. Networks are trained on a single V100 GPU with 16 GB of memory. Code is implemented in TensorFlow.

Training this example used various datasets. Two datasets containing images in-the-wild, COCO2017 (30,000 images) and OpenImages (24,000 images), were used for weakly-supervised training ("WS"). Two-dimensional keypoint annotations are used where available, otherwise a two-dimensional pose detector is used to supplement missing annotations (e.g., with an additional confidence score per keypoint). For the fully-supervised ("FS") training, two standard datasets are used: Human3.6M and 3DPW.

Example Results: Results for this example are provided in the Tables below. For this task, several common error metrics are reported that are used for evaluating the error of three-dimensional reconstruction. Most commonly used for three-dimensional joint errors are MPJPE and MPJPE after rigid alignment of the prediction with ground truth via Procrustes Analysis ("MPJPE-PA"). The latter metric removes global misalignment (e.g., scale and rotation) and evaluates the quality of the reconstructed three-dimensional pose. For evaluating three-dimensional shape, MPVPE is reported between the vertices of the predicted and ground-truth meshes.

For the Human3.6M dataset, there are three commonly used evaluation protocols in the literature. Protocols P1 and P2 consider splitting the official training set into new training and testing subsets, with subjects S1, S5-S8 for training and S9 and S11 for evaluation. P1 evaluates on all available camera views in testing, while P2 only on a single pre-defined camera view. The third protocol P3 evaluates on the hold-out test dataset of 900K samples. In this example, the model is not retrained on the whole official training dataset. For P1, results are reported for both the weakly supervised regime (WS) and for the mixed regime (WS+FS) in order to compare with other approaches. For P3, only the MPJPE is reported, rounded to the nearest integer.

For the Human3.6M dataset, data is provided as three-dimensional marker positions. A mesh was fit to this data in two ways for illustration purposes: (1) by minimizing an energy (e.g., using the parametric model) that takes into account three-dimensional marker ground truth, two-dimensional reprojection errors for all three-dimensional body joints of the parametric body model (including hands and face), and a semantic alignment cost, and (2) by running the pre-trained marker poser model on the ground-truth three-dimensional marker positions to produce a mesh $V_d$. In this example, the mean per-marker error is computed for the models $V_{gt}$ obtained from energy optimization to ground-truth markers $M_{gt}$ (e.g., those recovered from motion capture data). This gives an error of 38.4 mm, with an average processing rate of 0.15 frames per second. The errors of markers placed on the predicted mesh $V_d$ are also computed given ground-truth marker positions. This achieves a slightly higher error of 44.3 mm, but with an average processing rate of 1000 frames per second, when ran sequentially. Note that the marker poser in this example had never seen the marker sequences of Human3.6M during training, as the marker poser was trained with samples drawn from a normalizing flow prior based on the CMU motion capture dataset.

For the 3DPW dataset, because the ground-truth of 3DPW is provided as SMPL three-dimensional meshes, parametric body model fits to these meshes are used to report the vertex-to-vertex errors. The MPJPE metrics are reported on the three-dimensional joints regressed from the ground-truth SMPL meshes.

Results for the present example are given below. Results for the Present Example are determined based on the output direct mesh $V_d$.

TABLE 1

Error metrics reported on the Human3.6M (P1).

| Method | MPJPE-PA | MPJPE | Translation Error |
|---|---|---|---|
| HMR (WS) | 67.45 | 106.84 | NR |
| HUND (SS) | 66.0 | 102 | 175.0 |
| Present Example (WS) | 62.2 | 87.0 | 161.6 |
| HMR | 58.1 | 88.0 | NR |
| HUND | 53.0 | 72.0 | 160.0 |
| THUNDR | 39.8 | 55.0 | 143.9 |

TABLE 2

Error metrics reported on the Human3.6M dataset (P2)

| Method | MPJPE-PA | MPJPE |
|---|---|---|
| HMR | 56.8 | 88.0 |
| GraphCMR | 50.1 | NR |
| Pose2Mesh | 47.0 | 64.9 |
| I2L-MeshNet | 41.7 | 55.7 |
| SPIN | 41.1 | NR |
| Present Example | 34.9 | 48.0 |

TABLE 3

Error metrics reported on the 3DPW dataset.

| Method | MPJPE-PA | MPJPE | MPVPE |
|---|---|---|---|
| HUND (SS) | 70.3 | 98.1 | NR |
| THUNDR (WS) | 59.9 | 86.8 | NR |
| HMR | 81.3 | NR | NR |
| GraphCMR | 70.2 | NR | NR |
| SPIN | 59.2 | NR | 116.4 |
| Pose2Mesh | 58.9 | 89.2 | NR |
| I2L-MeshNet | 57.7 | 93.2 | NR |
| HUND | 56.5 | 87.7 | NR |
| THUNDR | 51.5 | 74.8 | 88.0 |

TABLE 4

Error metrics on the Human3.6M dataset (P3)

| Method | MPJPE |
|---|---|
| HMR | 89 |
| SPIN | 68 |

TABLE 4-continued

Error metrics on the Human3.6M dataset (P3)

| Method | MPJPE |
|---|---|
| HUND | 66 |
| THUNDR | 53 |

Ablation Study: In this example, for illustration different methodological choices are ablated in the weakly supervised regime. Results using protocol P2 of Human3.6M dataset are reported in Table 5. Results indicated for "Present Example $(V_p)$" are determined based on the output parametric mesh $V_p$. Results indicated for "Present Example (no marker)" are determined in an alternate example in which $(\tilde{\theta},\tilde{\beta},\tilde{r},\tilde{t})$ are directly regressed from the input image without the intermediate prediction of and regression from surface markers. For the "Present Example (no marker)" results, the convolutional-transformer architecture is modified to accommodate more output variables (e.g., with 4 extra input tokens, one for each regressed parameter, instead of 1).

TABLE 5

Ablation study with error metrics reported on Human3.6M (P2).

| Method | MPJPE-PA | MPJPE |
|---|---|---|
| Present Example (no marker) (WS) | 63.5 | 95.4 |
| Present Example $(V_p)$ (WS) | 61.8 | 88.3 |
| Present Example (WS) | 59.7 | 83.4 |

The results in this Present Example embodiment show lower error metrics than the "Present Example $(V_p)$" and the "Present Example (no marker)" outputs. This illustrates, for example, an advantage that in this embodiment, the intermediate surface marker representation was easier to learn from input image data. Similarly, the results illustrate the utility and benefits of working with two separate mesh reconstructions (e.g., in training and/or at inference) in some embodiments.

Example Methods

Figure 4:
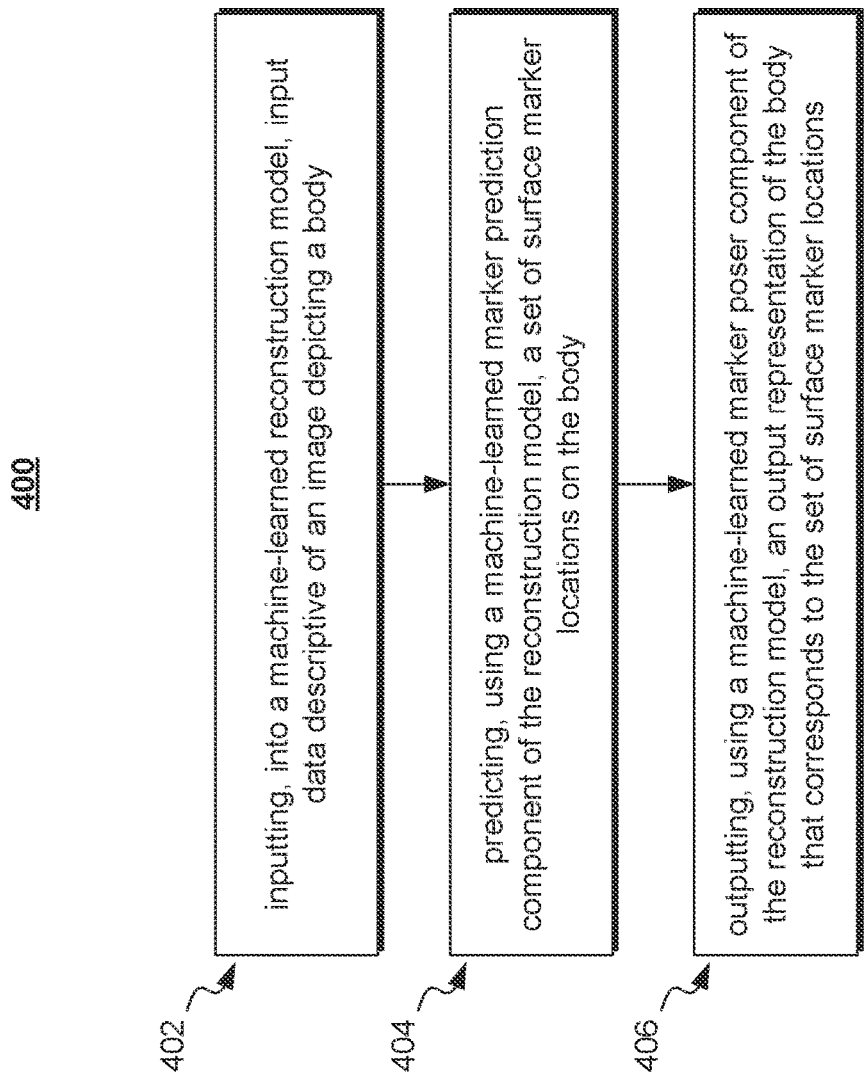
FIG. 4 depicts a flow chart diagram of an example method for reconstructing body shape and/or pose according to example embodiments of the present disclosure.

FIG. 4 depicts a flow chart diagram of an example method 400 to perform according to example embodiments of the present disclosure. Although FIG. 4 depicts steps performed in a particular order for purposes of illustration and discussion, the methods of the present disclosure are not limited to the particularly illustrated order or arrangement. The various steps of example method 400 can be omitted, rearranged, combined, and/or adapted in various ways without deviating from the scope of the present disclosure.

Example method 400 includes, at 402, inputting, by one or more computing devices into a machine-learned reconstruction model, input data descriptive of an image depicting a body. In some embodiments, of example method 400, the body is a human body and the kinematic constraints correspond to anthropometric constraints.

Example method 400 includes, at 404, predicting, by the one or more computing devices and using a machine-learned marker prediction component of the reconstruction model, a set of surface marker locations on the body. In some embodiments of example method 400, the marker prediction component comprises one or more encoder layers. In some embodiments of example method 400, the one or more encoder layers respectively comprise self-attention models.

In some embodiments of example method 400, the one or more encoder layers comprise a plurality of encoder layers that share one or more machine-learned weights. In some embodiments of example method 400, predicting the set of surface marker locations comprises encoding, by the one or more computing devices and using the one or more encoder layers, a surface marker embedding along with the input data; and updating, by the one or more computing devices, the set of surface marker locations based at least in part on the encoded surface marker embedding. In some embodiments of example method 400, an output of each of the one or more encoder layers is used to iteratively refine the set of surface marker locations, with the output corresponding to the surface marker embedding.

Example method 400 includes, at 406, outputting, by the one or more computing devices and using a machine-learned marker poser component of the reconstruction model, an output representation of the body that corresponds to the set of surface marker locations.

In some embodiments of example method 400, one or more parameters of the reconstruction model were learned at least in part based on a consistency loss corresponding to a distance between (i) a relaxed-constraint representation generated from a prior set of surface marker locations predicted according to the one or more parameters and (ii) a parametric representation generated from the prior set using kinematic constraints associated with the body.

In some embodiments of example method 400, the output representation is a parametric representation. In some embodiments of example method 400, the output representation is a relaxed-constraint representation. In some embodiments of example method 400, the output representation is based at least in part on both a parametric representation and a relaxed-constraint representation.

Some embodiments of example method 400 further include transforming, by the one or more computing devices and using a capture model, the input data, and the output representation is obtained in a capture space corresponds to the capture model. In some embodiments of example method 400, the capture model is based at least in part on a perspective model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for reconstructing representations of bodies from images, the method comprising:
   inputting, by one or more computing devices into a machine-learned reconstruction model, input data descriptive of an image depicting a body;
   predicting, by the one or more computing devices and using a machine-learned marker prediction component of the reconstruction model, a set of surface marker locations on the body; and
   outputting, by the one or more computing devices and using a machine-learned marker poser component of the reconstruction model, an output representation of the body that corresponds to the set of surface marker locations;
   wherein one or more parameters of the reconstruction model were learned at least in part based on a consistency loss corresponding to a distance between (i) a relaxed-constraint representation generated from a prior set of surface marker locations predicted according to the one or more parameters and (ii) a parametric representation generated from the prior set using kinematic constraints associated with the body.

2. The computer-implemented method of claim 1, wherein the body is a human body and the kinematic constraints correspond to anthropometric constraints.

3. The computer-implemented method of claim 1, wherein the output representation is a relaxed-constraint representation.

4. The computer-implemented method of claim 1, wherein the marker prediction component comprises one or more encoder layers.

5. The computer-implemented method of claim 4, wherein the one or more encoder layers respectively comprise self-attention models.

6. The computer-implemented method of claim 5, wherein predicting the set of surface marker locations comprises:
   encoding, by the one or more computing devices and using the one or more encoder layers, a surface marker embedding along with the input data; and
   updating, by the one or more computing devices, the set of surface marker locations based at least in part on the encoded surface marker embedding.

7. The computer-implemented method of claim 6, wherein an output of each of the one or more encoder layers is used to iteratively refine the set of surface marker locations, the output corresponding to the surface marker embedding.

8. The computer-implemented method of claim 7, wherein the one or more encoder layers comprise a plurality of encoder layers that share one or more machine-learned weights.

9. The computer-implemented method of claim 1, comprising:
   transforming, by the one or more computing devices and using a capture model, the input data; and
   wherein the output representation is obtained in a capture space corresponding to the capture model.

10. The computer-implemented method of claim 9, wherein the capture model is based at least in part on a perspective model.

11. A system for reconstructing representations of bodies from images, comprising:
one or more processors; and
one or more memory devices storing computer-readable instructions that, when implemented, cause the one or more processors to perform operations, the operations comprising:
inputting, into a machine-learned reconstruction model, input data descriptive of an image depicting a body;
predicting, using a machine-learned marker prediction component of the reconstruction model, a set of surface marker locations on the body; and
outputting, using a machine-learned marker poser component of the reconstruction model, an output representation of the body that corresponds to the set of surface marker locations;
wherein one or more parameters of the reconstruction model were learned at least in part based on a consistency loss corresponding to a distance between (i) a relaxed-constraint representation generated from a prior set of surface marker locations predicted according to the one or more parameters and (ii) a parametric representation generated from the prior set using kinematic constraints associated with the body.

12. The system of claim 11, wherein the body is a human body and the kinematic constraints correspond to anthropometric constraints.

13. The system of claim 11, wherein the output representation is a relaxed-constraint representation.

14. The system of claim 11, wherein the marker prediction component comprises one or more encoder layers.

15. The system of claim 14, wherein the one or more encoder layers respectively comprise self-attention models.

16. The system of claim 15, wherein predicting the set of surface marker locations comprises:
encoding, using the one or more encoder layers, a surface marker embedding along with the input data; and
updating the set of surface marker locations based at least in part on the encoded surface marker embedding.

17. The system of claim 16, wherein an output of each of the one or more encoder layers is used to iteratively refine the set of surface marker locations, the output corresponding to the surface marker embedding.

18. The system of claim 17, wherein the one or more encoder layers comprise a plurality of encoder layers that share one or more machine-learned weights.

19. A system for reconstructing representations of bodies from images, comprising:
one or more processors; and
one or more memory devices storing computer-readable instructions that, when implemented, cause the one or more processors to perform operations, the operations comprising:
inputting, into a machine-learned marker prediction model, input data descriptive of an image depicting a body;
predicting, using the marker prediction model, a set of surface marker locations on the body;
outputting, using a machine-learned marker poser model, a parametric representation of the body that corresponds to the set of surface marker locations; and
updating one or more parameters of the marker prediction model based at least in part on a consistency loss corresponding to a distance between the parametric representation and a relaxed-constraint representation associated with the predicted set of surface marker locations.

20. The system of claim 19, wherein the output representation is a relaxed-constraint representation.

* * * * *